US012754780B2

(12) United States Patent
Hou et al.

(10) Patent No.: US 12,754,780 B2
(45) Date of Patent: Oct. 6, 2026

(54) KEY SERVER AND STORAGE DEADLOCK CONTROL

(71) Applicant: International Business Machines Corporation, Armonk, NY (US)

(72) Inventors: Hong Xin Hou, Shanghai (CN); Wu Song Fang, Beijing (CN); Fang Wang, Beijing (CN); Yi Nong Xin, Hefei (CN); Ze Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 18/588,092

(22) Filed: Feb. 27, 2024

(65) Prior Publication Data

US 2025/0272162 A1 Aug. 28, 2025

(51) Int. Cl.
*G06F 9/52* (2006.01)
*H04L 9/08* (2006.01)

(52) U.S. Cl.
CPC ............ *G06F 9/524* (2013.01); *H04L 9/0894* (2013.01)

(58) Field of Classification Search
CPC ........................................................ G06F 9/524
USPC ........................................................... 718/104
See application file for complete search history.

(56) References Cited

U.S. PATENT DOCUMENTS 11,316,684 B2 4/2022 Agrawal et al.
2009/0312601 A1* 12/2009 Shigemori ............. G16H 40/63 714/48
2011/0261964 A1 10/2011 Kahler et al.
2014/0250441 A1* 9/2014 Tonouchi ............ G06F 11/3604 718/106
2019/0268149 A1 8/2019 Kariv et al.
2020/0169560 A1* 5/2020 Arora .................... H04L 9/3247
2021/0288799 A1 9/2021 Sheppard et al.
2024/0146526 A1* 5/2024 Schindewolf ......... H04L 9/0891

FOREIGN PATENT DOCUMENTS

CN 114244515 A 3/2022

OTHER PUBLICATIONS

Anonymous, "Creating the distributed key management contain in Active Directory," Hyper-V Network Virtualization Cookbook, Dec. 4, 2023, 3 pages.

(Continued)

*Primary Examiner* — Charlie Sun
(74) *Attorney, Agent, or Firm* — Cantor Colburn LLP; Stephen Yoder

(57) ABSTRACT

Techniques are provided for key server and storage deadlock control. In an embodiment, a method is provided that includes determining a location identifier of a key server. The method further includes determining a first storage identifier based on the location identifier, where the first storage identifier identifies a storage volume that stores cryptographic keys of the key server. The method further includes determining a second storage identifier that identifies a storage device or storage system that stores data at rest encrypted by the cryptographic keys. The method further includes identifying a potential deadlock between the key server and the storage device or storage system based on the first storage identifier and the second storage identifier. The method further includes controlling the key server based on the potential deadlock.

17 Claims, 3 Drawing Sheets

(56) References Cited

OTHER PUBLICATIONS

Anonymous, "Data Center Downtime at the Core and the Edge: A Survey of Frequency, Duration and Attitudes," Ponemon Institute Research Report, Jan. 2021, 14 pages.
Anonymous, "Encrypted logical volumes," IBM Documentation, Jul. 26, 2023, 10 pages.
Anonymous, "Encryption deadlock prevention," IBM Documentation, Mar. 3, 2023, 4 pages.
Pandey, "Adding keystores and truststores to microservices in Red Hat OpenShift," Red Hat Developer, Jun. 5, 2020, 10 pages.

* cited by examiner

KEY SERVER AND STORAGE DEADLOCK CONTROL

BACKGROUND

The present disclosure relates to encryption processes, and more specifically, to detecting and correcting deadlocks between key servers and encryption-enabled storage systems or storage devices.

A key server is a computer system that can store and manage cryptographic keys that are used to encrypt and decrypt data in compliance with data at rest requirements. Data at rest refers to encryption requirements that comply with various regulations and security audit readiness standards for data that is not actively being transferred or processed. To meet the data at rest requirements, the data and the cryptographic keys must be stored separately (e.g., on separate hardware systems, containers, or virtual machines). However, when the data and the cryptographic keys are stored separately, an inter-dependency deadlock can form between a storage system or storage device that hosts the data and the key server that hosts the cryptographic keys.

SUMMARY

A method is provided according to an embodiment of the present disclosure. The method includes determining a location identifier of a key server. The method further includes determining a first storage identifier based on the location identifier, where the first storage identifier identifies a storage volume that stores cryptographic keys of the key server. The method further includes determining a second storage identifier that identifies a storage device or storage system that stores data at rest encrypted by the cryptographic keys. The method further includes identifying a potential deadlock between the key server and the storage device or storage system based on the first storage identifier and the second storage identifier. The method further includes controlling the key server based on the potential deadlock.

A system is provided according to an embodiment of the present disclosure. The system includes at least one processor and a memory or storage comprising an algorithm or computer instructions, which when executed by the at least one processor, performs operations. The operations include determining a location identifier of a key server. The operations further include determining a first storage identifier based on the location identifier, where the first storage identifier identifies a storage volume that stores cryptographic keys of the key server. The operations further include determining a second storage identifier that identifies a storage device or storage system that stores data at rest encrypted by the cryptographic keys. The operations further include identifying a potential deadlock between the key server and the storage device or storage system based on the first storage identifier and the second storage identifier. The operations further include controlling the key server based on the potential deadlock.

A computer-readable storage medium having computer-readable program code embodied therewith, the computer-readable program code executable by one or more computer processors to perform operations, is provided according to an embodiment of the present disclosure. The operations include determining a location identifier of a key server. The operations further include determining a first storage identifier based on the location identifier, where the first storage identifier identifies a storage volume that stores cryptographic keys of the key server. The operations further include determining a second storage identifier that identifies a storage device or storage system that stores data at rest encrypted by the cryptographic keys. The operations further include identifying a potential deadlock between the key server and the storage device or storage system based on the first storage identifier and the second storage identifier. The operations further include controlling the key server based on the potential deadlock.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

Figure 1:
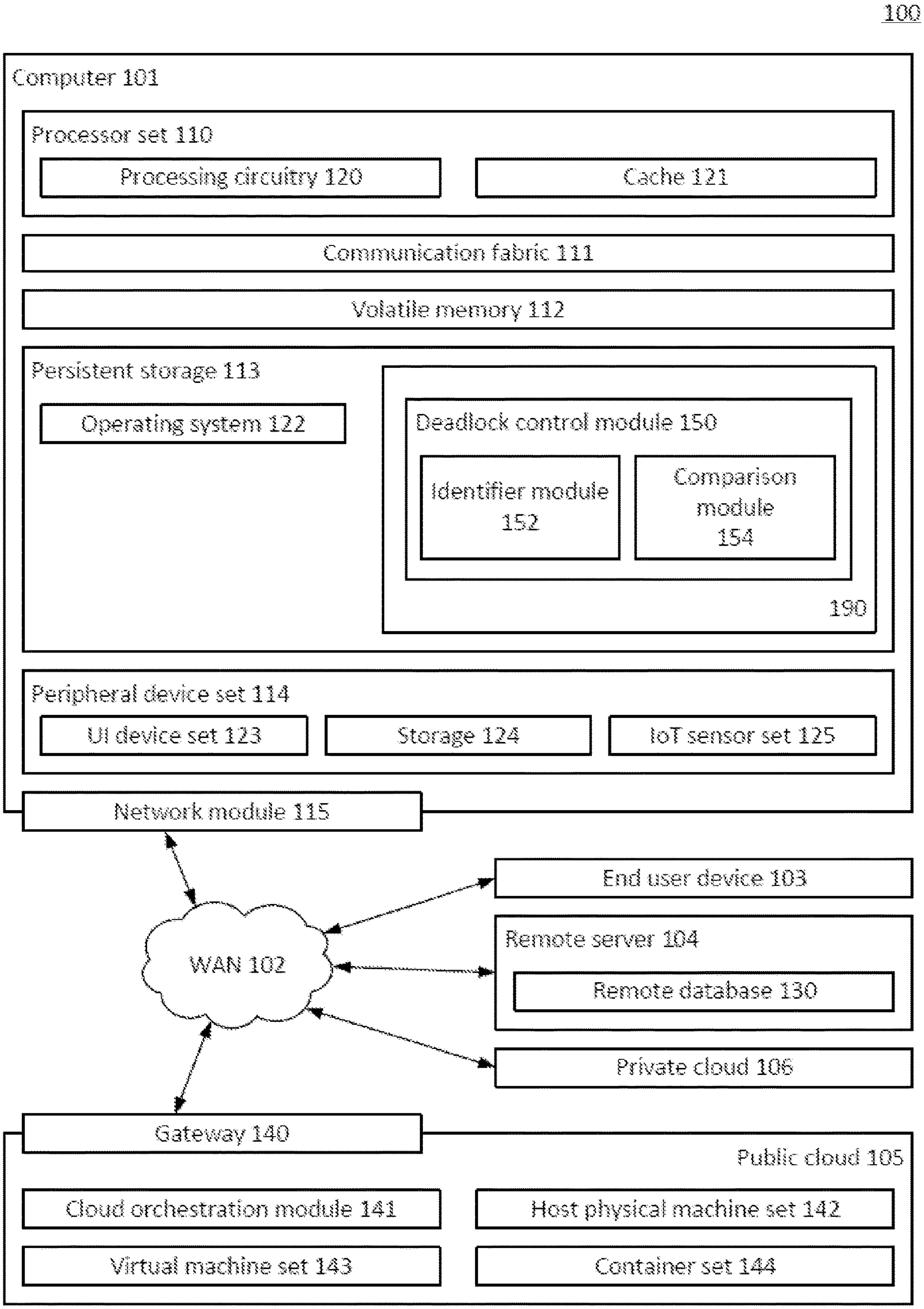
FIG. 1 illustrates a computing environment, according to an embodiment.

The detailed description explains embodiments of the disclosure, together with advantages and features, by way of example with reference to the drawings.

DETAILED DESCRIPTION

Embodiments of the present disclosure improve upon key server and storage deadlock control techniques by providing a deadlock control module to avoid deadlocks in storage devices and/or storage systems. A storage device refers to an individual device (e.g., a memory, a hard disk drive, etc.) for storing data. A storage system refers to a more comprehensive setup that includes not only one or more physical storage device(s) but also associated software, management tools, and infrastructure for organizing, accessing, and managing data. Storage systems often include multiple storage devices organized into arrays or clusters, along with networking components, controllers, and software for data management, redundancy, and performance optimization A deadlock can occur as follows. When a data center experiences a power outage, some storage systems and/or storage devices are shut down. After power is restored, the storage systems and/or storage devices are restarted, and encrypted storage systems and/or encrypted storage devices enter a maintenance mode awaiting a key server. If the key server fails to boot up properly or otherwise malfunctions because the key server application is installed on encrypted storage systems and/or encrypted storage devices that are managed by the key server itself, a deadlock situation occurs.

In embodiments, the deadlock control module uses World Wide Names (WWN), IP address, or iSCSI Qualified Name (IQN) (depending on different storage networking protocols) of storage volumes to identify a storage volume shared by cryptographic keys of a key server and data encrypted by the cryptographic keys. The deadlock control module can identify a potential deadlock between a key server and a storage device or storage system based on the shared storage volume and control the key server to manage the potential deadlock.

One benefit of the disclosed embodiments is to manage deadlocks, or prevent deadlocks, between key servers and storage devices or storage devices by controlling the key servers to store cryptographic keys separately from the storage devices or storage systems. Further, embodiments of the present disclosure can improve compliance with regulations and security audit readiness standards by managing the storage of cryptographic keys. Moreover, one or more embodiments can be deployed in various environments, such as a virtualization-based deployment, a container-based deployment, and a bare-metal based deployment, among others.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a deadlock control module 150, which includes an identifier module 152 and a comparison module 154. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
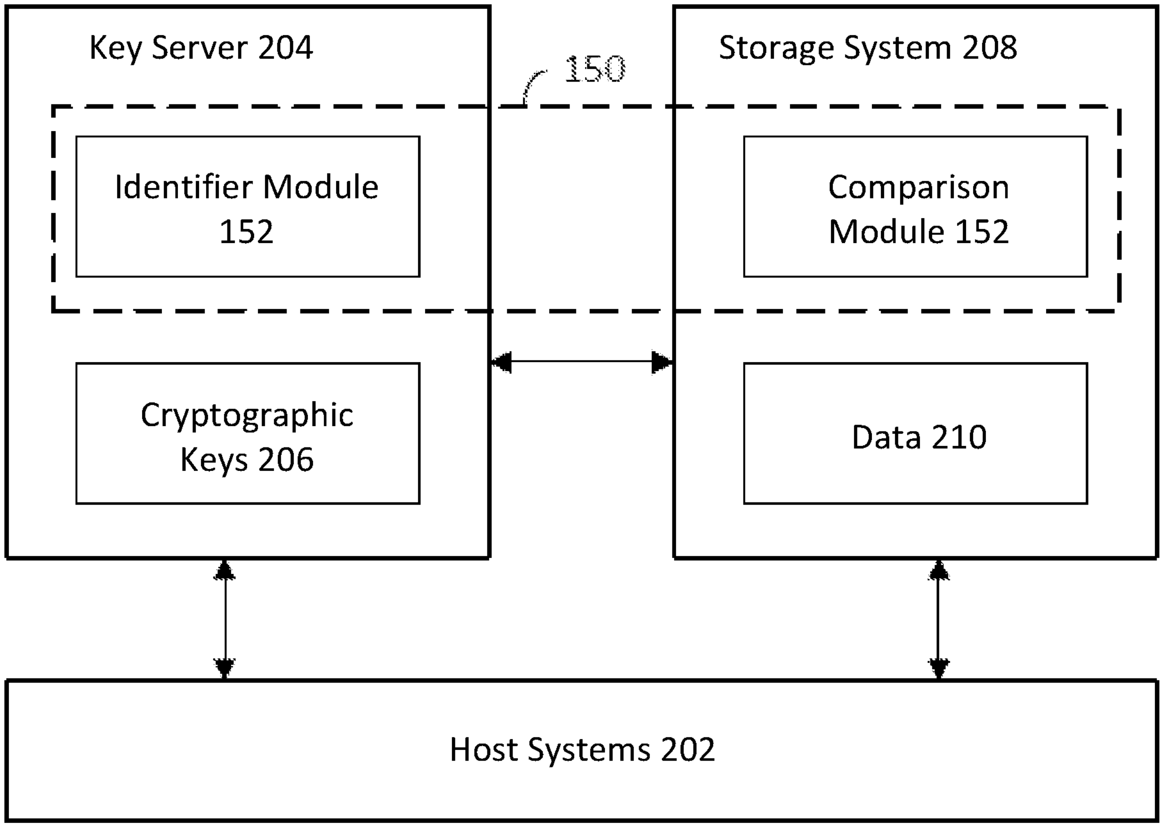
FIG. 2 illustrates a deadlock detection environment, according to an embodiment.

FIG. 2 illustrates a deadlock detection environment 200, according to an embodiment. In the illustrated embodiment, one or more host systems 202 host a key server 204 and a storage system 208. It should be appreciated that the storage system 208 can represent any of a storage system, a storage device, and/or combinations of one or more storage systems and/or one or more storage devices.

The host systems 202 can include at least one computer system (e.g., computer 101, the cloud orchestration module 141, the host physical machine set 142, the virtual machine set 143, the container set 144, or the like). In an embodiment, the host systems 202 include a physical computer system that host the key server 204 and the storage system 208.

In another embodiment, the host systems 202 include a hypervisor that runs at least one virtual machine, which hosts the key server 204 or a management application of the storage system 208. In yet another embodiment, the host systems 202 include a container runtime engine that runs at least one container, which hosts the key server 204 or the management application of the storage system 208.

The management application can include, can be integrated with, or can be included in, at least one module of the deadlock control module 150. Hence, modules of the deadlock control module 150 (e.g., the identifier module 152 and/or the comparison module 154) may perform functions of the management application, such as controlling access to data 210 at rest on the storage system 208.

In the illustrated embodiment, the key server 204 is a computer system that generates, authenticates, stores, and manages (e.g., distributes or revokes) cryptographic keys 206 that are used to encrypt and decrypt data 210 at rest on the storage system 208. In an embodiment, the key server 204 is a software application that performs the operations described herein.

The cryptographic keys 206 and the data 210 are shown as being stored on different computer systems (the key server 204 and the storage system 208, respectively, which can use different storage volumes). That is, in an embodiment, the cryptographic keys 206 and the data 210 are stored on different storage systems.

The storage system 208 can be representative of hard-disk drives, solid state drives, flash memory devices, optical media, and the like. The storage system 208 can also include structured storage (e.g., a database). In addition, the storage system 208 may be considered to include memory physically located elsewhere. For example, the storage system 208 may be physically located on another computer communicatively coupled to the host systems 202 via the WAN 102 or another suitable communications link.

The key server 204 and the storage system 208 can include modules of the deadlock control module 150, such as the identifier module 152 and the comparison module 154. In the illustrated embodiment, the identifier module 152 deployed to the key server 204, and the comparison module 154 is deployed to the storage system 208. It should be appreciated that other configurations/arrangements are also possible. In an embodiment, the deadlock control module 150, and the modules included therein, represent one or more algorithms, instruction sets, software applications, or other computer-readable program code that can be executed by a processor (e.g., processor set 110) to perform the functions, operations, or processes described herein.

The identifier module 152 can collect information from the key server 204 and/or the host systems 202, and determine a first storage identifier (e.g., a first World Wide Name (WWN)) of a storage volume that includes the cryptographic keys 206. The comparison module 154 can collect information from the storage system 208 and/or the host systems 202 and determine a second storage identifier (e.g., a second WWN) of a storage volume that includes the data 210. Afterwards, the deadlock control module 150 can use the first storage identifier and the second storage identifiers (e.g., WWNs, IP address, or IQN) to determine whether the cryptographic keys 206 and the data 210 are stored on the same storage volume. The deadlock control module 150 can then control the key server 204 and/or a management application of the storage system 208 to migrate the cryptographic keys 206 to another computer system. These operations are described further in FIG. 3, below.

Figure 3:
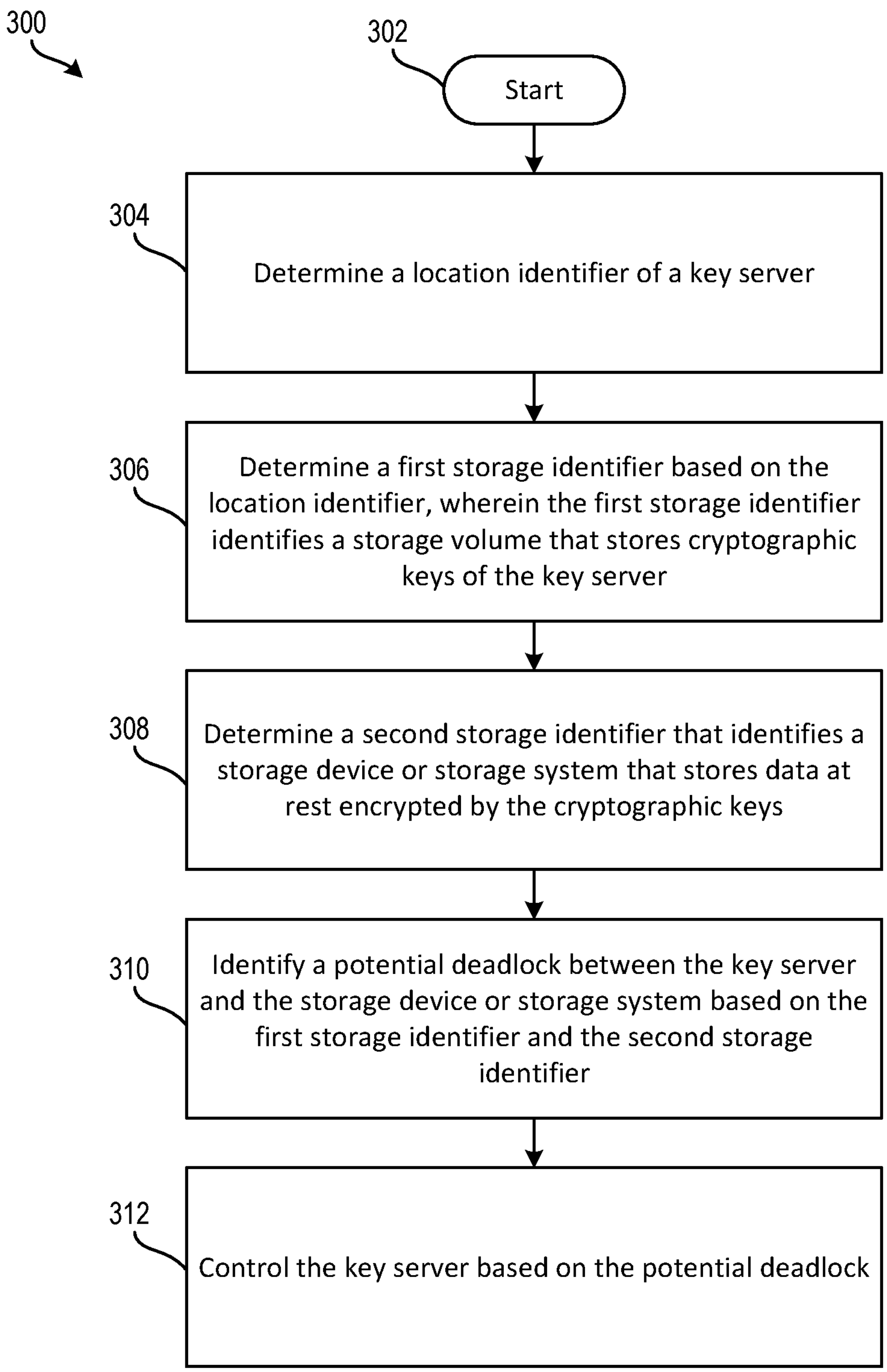
FIG. 3 illustrates a flowchart of a method of detecting a deadlock between a key server and an encryption enabled storage system, according to an embodiment.

FIG. 3 illustrates a flowchart of a method 300 of detecting a deadlock between a key server 204 and an encryption enabled storage system 208, according to an embodiment. The method 300 can be performed by any suitable computing system, device, or environment, such as those described herein.

The method 300 begins at block 302. In an embodiment, prior to using the encryption keys 206 to encrypt the data 210, the storage system 208 sends a request to the key server 204 to define a master key server, which enables the storage system 208 to configure the key server 204 to perform operations described herein At block 304, the deadlock control module 150 determines a location identifier of a key server (e.g., the key server 204). In an embodiment, the location identifier includes at least one of: a container name, a storage volume name, a name of a storage volume claim, hypervisor system information, an Internet Protocol (IP) address, an Internet Small Computer System Interface Qualified Name (IQN), a World Wide Name (WWN), a World Wide Port Name (WWPN), or the like.

The comparison module 154 of the deadlock control module 150 can use polling techniques to periodically request the location identifier of the key server 204. The key server 204 can include hardware monitoring software that determines or receives the location identifier from the key server 204 and/or the host systems 202. The hardware monitoring software can include, can be integrated with, or can be included in, at least one module of the deadlock control module 150. Hence, modules of the deadlock control module 150 (e.g., the identifier module 152 and/or the comparison module 154) may perform functions of the hardware monitoring software, such as executing command line interface (CLI) command or application programmable interface (API) commands to retrieve the location identifier.

In an embodiment, the identifier module 152 can determine whether the location identifier is valid or invalid. For example, the identifier module 152 may return an invalid location identifier in a response to the request of the comparison module 154. Responsive to receiving the response, the comparison module 154 can verify whether the location identifier is valid by comparing the location identifier to location identifier formats. For example, when the location identifier of the key server 204 includes an IPV4 address, the comparison module 154 can determine whether the received IP address is a 32-bit number format written in decimal form and separated by periods into four 8-bit fields. In an embodiment, the comparison module 154 determines that the location identifier is invalid when a response is not received within a predetermined time of initiating the request for the location identifier.

Responsive to determining that the location identifier is invalid, the comparison module 154 can generating a warning message, and transferring the warning message to the key server 204. The method 300 then proceeds to block 314, where the method 300 ends. Returning to block 304, responsive to determining that the location identifier is valid, the method 300 proceeds to block 306. It should be appreciated that, in some embodiments, the method 300 can proceed from block 304 to block 306 without determining whether the location identifier is valid.

At block 306, the deadlock control module 150 determines a first storage identifier based on the location identifier. The first storage identifier identifies a storage volume that stores cryptographic keys of the key server. In an embodiment, a storage identifier is a World Wide Name (WWN) or an IP address of a network file storage (NFS). The location identifier can include the first storage identifier.

In an embodiment, when the key server 204 is deployed to a container, the location identifier may include the container name. In this instance, the identifier module 152 can execute CLI commands to identify a first WWN of the storage volume. For instance, the first WWN may be displayed in plain-text when the identifier module 152 executes a CLI command to describe the container.

When the first WWN is not stated in a response of the key server 204 or the hosts systems 202 to the CLI command, the identifier module 152 may use a definition file of the container to identify a storage volume or a storage volume claim associated with the container. The identifier module 152 can then use a mapping list of storage volume claims to storage volumes to determine the first WWN from the definition file, or from container storage interface (CSI) provisioner data. The first WWN can be transferred to the comparison module 154.

In an embodiment, when the key server 204 is deployed to a virtual machine, the location identifier can include hypervisor system information that identifies the hypervisor that runs the virtual machine. When the storage volume is mounted in the virtual machine through an NFS, the identifier module 152 can transfer the IP address of the NFS to the comparison module 154, in lieu of transferring the first WWN.

In an embodiment in which the storage volume is directly mapped to the virtual machine through a Fibre Channel (FC) or iSCSI (i.e., when there is a raw mapping), the identifier module 152 can identify the plain-text assignment of the first WWN to the FC or iSCSI. Afterwards, the identifier module 152 can transfer the first WWN to the comparison module 154.

In an embodiment in which the storage volume is assigned to the virtual machine through the host systems 202, the identifier module 152 can request that the virtual machine retrieve the first WWN from the host systems 202. Afterwards, the identifier module 152 can transfer the received first WWN to the comparison module 154.

In an embodiment, when the key server 204 is run directly on an operating system of the host systems 202, the identifier module 152 can determine an NFS IP address or the first WWN using processes similar to the processes used when the key server 204 is deployed to a virtual machine. Afterwards, the identifier module 152 can transfer the NFS IP address, or the first WWN to the comparison module 154.

At block 308, the deadlock control module 150 determines a second storage identifier. The second storage identifier identifies a storage device or storage system that stores data at rest encrypted by the cryptographic keys. In an embodiment, the comparison module 154 can retrieve the second storage identifier using processes similar to the processes described at block 306.

At block 310, the deadlock control module 150 identifies a potential deadlock between the key server and the second storage volume based on the first storage identifier and the second storage identifier. In an embodiment, a deadlock occurs when two or more operations are stalled because each operation is dependent on the other to release a resource.

For instance, as previously discussed, the cryptographic keys 206 of a key server 204 can be used to encrypt data 210 on a storage system 208. In the event of a power outage at a datacenter for example, the storage system 208 may wait for the cryptographic keys 206 to be sent from the key server 204 to decrypt the data 210. However, if the cryptographic keys 206 and the storage system 208 use the same storage volume, the key server 204 will not have access to the cryptographic keys 206. Hence, the storage system 208 will not receive the cryptographic keys 206 from the key server 204, and operations of the storage system 208 will stall. Meanwhile, the key server 204 can fail to properly boot or function due to the lack of access to required software stored on the storage system 208.

In an embodiment, the deadlock control module 150 determines that a potential deadlock may form between the key server 204 and the second storage volume when the first storage identifier matches the second storage identifier, which enables a dependency of the key server 204 to be stored on the second storage volume. That is, the method 300 can include identifying a match between the first storage identifier and the second storage identifier, where the match indicates the presence of the potential deadlock. In an embodiment, the dependency represents at least one of: the cryptographic keys 206, or an element of the key server 204 that enables a boot up or an operation of the key server 204.

At block 312, the deadlock control module 150 controls the key server 204 based on the potential deadlock. In an embodiment, upon determining that a device request of the key server 204 to access the second storage volume involves an initial setup of the key server 204 or the second storage volume, the deadlock control module 150 can control the key server 204 to reject the device request.

In another embodiment, upon determining that a device request of the key server 204 to access the second storage volume does not involve an initial setup of the key server 204 or the second storage volume, the deadlock control module 150 generates an alert or a warning message to migrate the cryptographic keys 206 to another storage device or storage system. Afterwards, the deadlock control module 150 can perform a corresponding key server migration process.

Some or all of the blocks of the method 300 may be performed on a regular schedule. The method 300 ends at block 314.

Additional processes also may be included, and it should be understood that the processes depicted in FIG. 3 represent illustrations, and that other processes may be added or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processor set 110) of a computing system (e.g., the computer 101), cause the processor to perform the processes described herein.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:

determining a location identifier of a key server;

determining a first storage identifier based on the location identifier, wherein the first storage identifier identifies a storage volume that stores cryptographic keys of the key server;

determining a second storage identifier that identifies a storage device or storage system that stores data at rest encrypted by the cryptographic keys;

identifying a potential deadlock between the key server and the second storage volume based on the first storage identifier and the second storage identifier;

controlling the key server based on the potential deadlock;

responsive to determining that a device request of the key server to access the storage device or storage system involves an initial setup of the key server and the location identifier, rejecting the device request of the key server to the storage device or storage system.

2. The computer-implemented method of claim 1, wherein the location identifier includes at least one of: a container name, a storage volume name, a name of a storage volume claim, hypervisor system information, an Internet Protocol address, an Internet Small Computer System Interface Qualified Name, a World Wide Name, or a World Wide Port Name; and wherein the first storage identifier and the second storage identifier each include one of: a World Wide Name or a Network File Storage Internet Protocol address.

3. The computer-implemented method of claim 1, wherein identifying a potential deadlock between the key server and the second storage volume comprises identifying a match between the first storage identifier and the second storage identifier, the match indicating a presence of the potential deadlock, wherein the potential deadlock involves a dependency of the key server stored on the second storage volume.

4. The computer-implemented method of claim 3, wherein the dependency represents at least one of: the cryptographic keys or an element of the key server that enables a boot up or a function of the key server.

5. The computer-implemented method of claim 1, further comprising:

determining that the location identifier of the key server is invalid;

responsive to determining that the location identifier of the key server is invalid, generating a warning message; and transferring the warning message to the key server.

6. The computer-implemented method of claim 1, further comprising:

responsive to determining that a device request of the key server to access the storage device or storage system does not involve an initial setup of the key server and the location identifier, generating an alert or a warning message to migrate the cryptographic keys to another storage device or storage system; and performing a key server migration process.

7. A system, comprising:

at least one processor; and memory or storage comprising an algorithm or computer instructions, which when executed by the at least one processor, performs an operation comprising:

determining a location identifier of a key server;

determining a first storage identifier based on the location identifier, wherein the first storage identifier identifies a storage volume that stores cryptographic keys of the key server;

determining a second storage identifier that identifies a storage device or storage system that stores data at rest encrypted by the cryptographic keys;

identifying a potential deadlock between the key server and the storage device or storage system based on the first storage identifier and the second storage identifier;

controlling the key server based on the potential deadlock; and responsive to determining that a device request of the key server to access the storage device or storage system involves an initial setup of the key server or the storage device or storage system, rejecting the device request of the key server to the storage device or storage system.

8. The system of claim 7, wherein the location identifier includes at least one of: a container name, a storage volume name, a name of a storage volume claim, hypervisor system information, an Internet Protocol address, an Internet Small Computer System Interface Qualified Name, a World Wide Name, or a World Wide Port Name; and wherein the first storage identifier and the second storage identifier each include one of: a World Wide Name or a Network File Storage Internet Protocol address.

9. The system of claim 7, wherein identifying a potential deadlock between the key server and the storage device or storage system comprises identifying a match between the first storage identifier and the second storage identifier, the match indicating a presence of the potential deadlock, wherein the potential deadlock involves a dependency of the key server stored on the storage device or storage system.

10. The system of claim 9, wherein the dependency represents at least one of: the cryptographic keys, or an element of the key server that enables a boot up or a function of the key server.

11. The system of claim 7, the operation further comprising:

determining that the location identifier of the key server is invalid;

responsive to determining that the location identifier of the key server is invalid, generating a warning message; and transferring the warning message to the key server.

12. The system of claim 7, the operation further comprising:

responsive to determining that a device request of the key server to access the storage device or storage system does not involve an initial setup of the key server or the storage device or storage system, generating an alert or a warning message to migrate the cryptographic keys to another storage device or storage system; and performing a key server migration process.

13. A computer-readable storage medium having a computer-readable program code embodied therewith, the computer-readable program code executable by one or more computer processors to perform operations comprising:

determining a location identifier of a key server;

determining a first storage identifier based on the location identifier, wherein the first storage identifier identifies a storage volume that stores cryptographic keys of the key server;

determining a second storage identifier that identifies a storage device or storage system that stores data at rest encrypted by the cryptographic keys;

identifying a potential deadlock between the key server and the storage device or storage system based on the first storage identifier and the second storage identifier;

controlling the key server based on the potential deadlock; and responsive to determining that a device request of the key server to access the second storage volume involves an initial setup of the key server or the second storage volume, rejecting the device request of the key server to the storage device or storage system.

14. The computer-readable storage medium of claim 13, wherein the location identifier includes at least one of: a container name, a storage volume name, a name of a storage volume claim, hypervisor system information, an Internet Protocol address, an Internet Small Computer System Interface Qualified Name, a World Wide Name, or a World Wide Port Name; and wherein the first storage identifier and the second storage identifier each include one of:

a World Wide Name or a Network File Storage Internet Protocol address.

15. The computer-readable storage medium of claim 13, wherein identifying a potential deadlock between the key server and the second storage volume comprises identifying a match between the first storage identifier and the second storage identifier, the match indicating a presence of the potential deadlock, wherein the potential deadlock involves a dependency of the key server stored on the second storage volume, and wherein the dependency represents at least one of: the cryptographic keys, or an element of the key server that enables a boot up or a function of the key server.

16. The computer-readable storage medium of claim 13, the operation further comprising:

determining that the location identifier of the key server is invalid;

generating a warning message; and transferring the warning message to the key server.

17. The computer-readable storage medium of claim 13, the operation further comprising:

responsive to determining that a device request of the key server to access the second storage volume does not involve an initial setup of the key server or the second storage volume, generating an alert or a warning message that to migrate the cryptographic keys to another storage device or storage system; and performing a key server migration process.

* * * * *